US007901279B2

(12) United States Patent
Finocchio

(10) Patent No.: US 7,901,279 B2
(45) Date of Patent: Mar. 8, 2011

(54) METHOD OF PLAYING A GAME OF CHANCE AND SYSTEM FOR FACILITATING THE PLAY THEREOF

(76) Inventor: Richard Finocchio, Everett, MA (US)

( * ) Notice: Subject to any disclaimer, the term of this patent is extended or adjusted under 35 U.S.C. 154(b) by 856 days.

(21) Appl. No.: 10/382,815

(22) Filed: Mar. 5, 2003

(65) Prior Publication Data

US 2004/0176154 A1 Sep. 9, 2004

(51) Int. Cl.
*A63F 9/24* (2006.01)
*A63F 13/00* (2006.01)

(52) U.S. Cl. ............................................ 463/13; 463/16

(58) Field of Classification Search .................... 463/13, 463/16, 17, 18, 19, 20; 273/138.1, 139
See application file for complete search history.

(56) References Cited

U.S. PATENT DOCUMENTS

| | | | | |
|---|---|---|---|---|
| 4,191,376 | A * | 3/1980 | Goldman et al. | 273/139 |
| 4,591,190 | A * | 5/1986 | Clark | 283/102 |
| 5,092,598 | A * | 3/1992 | Kamille | 273/139 |
| 5,979,894 | A * | 11/1999 | Alexoff | 273/139 |
| 5,996,997 | A | 12/1999 | Kamille | |
| 6,168,521 | B1 * | 1/2001 | Luciano et al. | 463/18 |
| 6,206,780 | B1 | 3/2001 | Awada | |
| 6,224,055 | B1 | 5/2001 | Walker et al. | |
| 6,250,685 | B1 | 6/2001 | Walker et al. | |
| 6,309,298 | B1 * | 10/2001 | Gerow | 463/20 |
| 2002/0153662 | A1 * | 10/2002 | Webb et al. | 273/292 |

* cited by examiner

*Primary Examiner* — Melba Bumgamer
*Assistant Examiner* — Jasson H Yoo
(74) *Attorney, Agent, or Firm* — Sullivan & Worcester LLP; Christopher T. McWhinney

(57) ABSTRACT

A method for playing a game of chance and system for facilitating the play of the game are disclosed. The method of playing the game of chance includes receiving a ticket containing a set of playing cards. The method of playing the game of chance further includes viewing a display screen that displays a second set of playing cards. The method of playing the game further includes receiving a prize if the combination of the playing cards on the ticket and the playing cards on the display matches a predetermined pattern.

29 Claims, 11 Drawing Sheets

800

| | | | | | |
|---|---|---|---|---|---|
| 123456 | 1979621 | 11/01/02 14:42 | 20$ | UNREDEEMED | 810 |
| 123457 | 1979621 | 11/01/02 14:45 | 2$ | UNREDEEMED | 810 |
| 123458 | 1979621 | 11/01/02 14:49 | 0$ | UNREDEEMED | 810 |
| 123459 | 1979621 | 11/01/02 14:53 | 2$ | UNREDEEMED | 810 |

Figure 8a

| 860 | 850 | 840 | 830 | 820 | |
|---|---|---|---|---|---|
| 123458 | 1979621 | 1/10/02 3:56 | 20$ | UNREDEEMED | 810 |

Figure 8b

1000

| | Winning Hands | Prize Amount | |
|---|---|---|---|
| 1005 | One Pair | $1 | 1040 |
| 1010 | Two Pair | $2 | 1045 |
| 1015 | Three of a Kind | $5 | 1050 |
| 1020 | Full House | $10 | 1055 |
| 1025 | Straight | $20 | 1060 |
| 1030 | Four of a Kind | $50 | 1065 |
| 1035 | Straight Flush | $500 | 1070 |

Figure 10

METHOD OF PLAYING A GAME OF CHANCE AND SYSTEM FOR FACILITATING THE PLAY THEREOF

A portion of the disclosure of this patent document contains material which is subject to copyright protection. The copyright owner has no objection to the facsimile reproduction by anyone of the patent document or patent disclosure as it appears in the Patent and Trademark Office patent file or records, but otherwise reserves all copyright rights whatsoever.

BACKGROUND INFORMATION

Lottery game tickets are frequently sold in retail establishments such as convenience stores, liquor stores, and the like. These and other establishments selling lottery tickets are sensitive to the costs of counter space used, and labor required in the sale and redemption of lottery tickets. Some lottery customers do not want to wait for a weekly or daily drawing. These customers may purchase "instant-win" lottery tickets. Such tickets may also involve games, such as lotto, battleship, bingo, or other games that increase customer interest and enjoyment in the purchase of such tickets. Instant-win lottery tickets are generally sold to retailers in pre-printed books or bundles. A pre-printed ticket may have a printed indicia or message indicating the ticket is a winner and/or the prize amount, as well as human or machine-readable codes for authenticating winning tickets. These indicia, messages, and codes may be hidden, e.g., with a peel-off or scratch-off coating. Commonly, whether an instant-win ticket is a winner is predetermined prior to the sale of the ticket. Examples of instant win tickets involving card games are described in U.S. Pat. Nos. 6,250,685, 6,206,780, and 6,168,521.

Instant-win games differ from pooled drawing games, where a lottery ticket represents a chance in a drawing to be held at some later time for a pooled prize or prizes. Rather, in an instant-win game, whether the ticket is a winner is determined at or before the time the ticket is purchased, although whether the ticket is actually a winner may be concealed from the buyer and seller. Instant-win games may include "extended play" features such as games printed on the ticket, e.g., bingo or number matching. These features may increase the enjoyment and interest level of purchasers of such tickets, causing them to buy tickets in greater numbers or more frequently.

In addition to instant-win tickets some retail establishments, such as bars, restaurants or delicatessens, may offer traditional lottery games or Keno. In a traditional lottery game a ticket is purchased, numbers are randomly drawn and the ticket is matched against the numbers drawn to determine whether the ticket is a winning ticket. Keno is similar to a traditional lottery game where a customer picks numbers and then matches those numbers to a second set of drawn numbers to determine if the ticket is a winning ticket. However, Keno drawings occur more frequently than the traditionally lottery drawings, once every 10 or 15 minutes, thus offering customers a more frequent opportunity to play than traditionally lottery drawings. In Keno and traditional lottery drawings whether the ticket is a winning ticket is not determined prior to the sale of the ticket.

BRIEF DESCRIPTION OF THE DRAWINGS

FIG. 8 illustrates an example ticket log for use in facilitating the play of a game of chance, according to an example embodiment of the present invention.

FIG. 10 illustrates an example chart that may be used in the play of a game of chance.

DETAILED DESCRIPTION OF EXAMPLE EMBODIMENTS

In an example embodiment of the present invention, a customer may purchase a lottery ticket. The lottery ticket may include a first set of symbols, such as playing cards. Subsequent to the ticket purchase, a second set of symbols, e.g., a second set of playing cards, may be depicted on a display terminal. The first set of symbols included on the ticket may be combined with the second set of symbols on the display to form a card hand. A card hand may then be matched against a predetermined pattern to determine whether a ticket is a winning ticket. For instance, when the cards depicted on the ticket and those displayed on the screen result in predetermined patterns such as three of a kind, four of a kind, a full house, a straight or a flush according to the ordinary rules of poker the ticket may be winning ticket. The amount won may depend on which predetermined pattern is matched, e.g. a pair may pay 1$, a straight $50, and a straight flush $1,000.

In the example embodiment of the present invention a customer may feel like he or she is actually playing a game of cards. The initial symbols represented on the ticket may represent an initial hand of cards. As the symbols on the screen are displayed the customer may feel like more cards are being dealt. The presentation of symbols in such a manner may allow the customer to feel like he or she is actually playing a game of cards and thus provide a better playing experience than a Keno type game.

In one example embodiment, the selected symbols that are to be displayed may be determined prior to the time the ticket is received by the customer. In this way the amount of money that is owed in unredeemed tickets is known at all times. Additionally, this allows game administrators to know the amount that should be paid if all winning tickets are redeemed.

Each time symbols are displayed on the display terminal it may be a separate game. Tickets may be purchased for an individual game or for multiple games. In one example embodiment, symbols may be displayed at regular intervals, e.g. every ten or fifteen minutes. This enables a customer to play in multiple games without having to leave an establishment.

Example Procedure for Playing a Game of Chance

Figure 1:
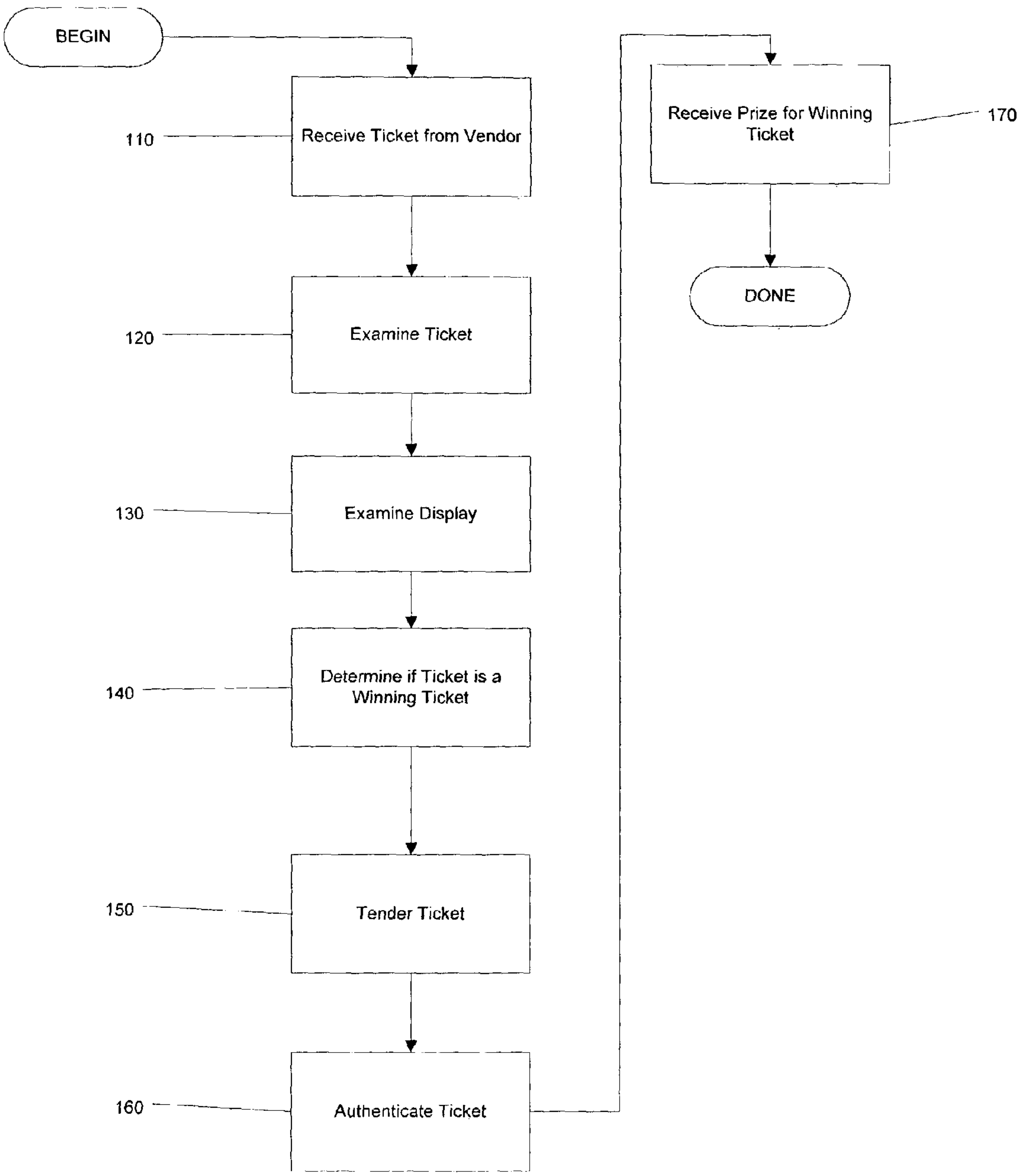
FIG. 1 illustrates an example procedure for playing a game of chance, according to an example embodiment of the present invention.

FIG. 1 illustrates an example procedure for playing a game of chance, according to an example embodiment of the present invention. In 110, a ticket may be received for a game of chance. The ticket may be received in a variety of way, e.g., by requesting a ticket from a cashier or establishment operator or by purchasing a ticket from a vending machine that generates such tickets. The ticket may include the information contained in the two example tickets, explained below. For example the ticket may include a set of symbols, an authentication code, a time/date field, a games played field, or game instructions. It will be appreciated that a ticket may be received for a number of games of chance. Additionally, multiple chances may be purchased in a single game.

In 120, the ticket may be examined to determine the symbols located on the ticket. The set of symbols may be chosen from a predetermined set. For example, the symbols may be playing cards chosen from a conventional pack. It will be appreciated that the symbols may also represent symbols in addition to ordinary playing cards, e.g. special playing cards such as jokers or wild cards. Additionally, it will be appreciated that the ticket may be examined to determine the game number that the ticket is for as well as other information contained on the ticket such as the rules of the game.

In 130, a display screen may be examined to determine the symbols located on the display screen. The set of symbols may be chosen from a predetermined set. For example, the symbols may be playing cards chosen from a conventional pack. It will be appreciated that the symbols may also represent symbols in addition to ordinary playing cards, e.g. special playing cards such as jokers or wild cards.

In 140, the set of symbols on the ticket may be combined with the symbols on the display terminal to determine whether the ticket is a winning ticket. The symbols depicted on a customer's ticket may be combined with the symbols on the display to form a customer's hand.

Once the symbols displayed on the screen whether a hand of cards matches a predetermined pattern may then be determined. A winning ticket may be redeemable for a prize. The amount of the prize may vary depending on the rules of the game. For example, the prize may vary depending on whether a customer's hand of cards, the combination of the playing cards depicted on the ticket and those depicted on the display, match a predetermined pattern. Three of a kind, a full house, a straight, or a flush may be predetermined patterns that result in a winning ticket. It will be appreciated that the predetermined patterns may be poker hands. The value of the prize may vary in light of the strength of the poker hand. For instance, a royal flush is the highest hand one may receive in poker and thus it may provide the greatest prize if matched by the customer's hand. Of course, depending on the rules of the game different predetermined patterns may result in a winning ticket.

In an example embodiment, the predetermined patterns that result in winning tickets may be printed on the ticket to let the customer know the winning hands. The example chart in FIG. 9 indicates example predetermined patterns that may result in a winning tickets and the prize amount for each example predetermined pattern. This example chart may be printed on a ticket. It will be appreciated that the prize amount for each predetermined pattern and the predetermined patterns that result in a winning tickets may vary.

In 150, the customer may tender the ticket, e.g., by presenting it to the cashier or placing it in a ticket validator. The gaming procedure may require tickets to be redeemed at the same establishment where they are sold, or may allow ticket to be redeemed at a future time and at various locations.

In 160, the ticket may be authenticated to determine whether the ticket is actually a valid winning ticket, e.g., if the ticket is a winning ticket and has not previously been redeemed. The authentication may be done by use of an authentication code that uniquely identifies the ticket. Conventional schemes for authenticating ticket numbers may be employed, e.g., the authentication number may be used as part of a public key encryption system. The authentication may be done by first ensuring that the ticket is a winning ticket.

This information may be determined by looking up the authentication code in a log that includes information identifying the previously sold tickets as winning tickets or losing tickets. In the event that a ticket is identified as a winning ticket the log may also indicate the prize. Alternatively, the prize information may be encoded in the authentication number, e.g., by using a public key encryption system, as is done in some conventional instant win ticket game systems. The fact that the ticket is being redeemed may additionally be recorded, so that the ticket may not be redeemed again in the future.

In 170, if the ticket is valid winning ticket, a prize may be paid for the winning ticket. The prize may be anything of value including additional tickets. The ticket may be branded to indicate on the face of the ticket that a ticket has been redeemed for a prize. The placing of a brand or visual mark on the face of the ticket may make it apparent that a ticket has been redeemed without the need for further authentication.

Example Procedure for Facilitating the Play of a Game of Chance

Figure 2:
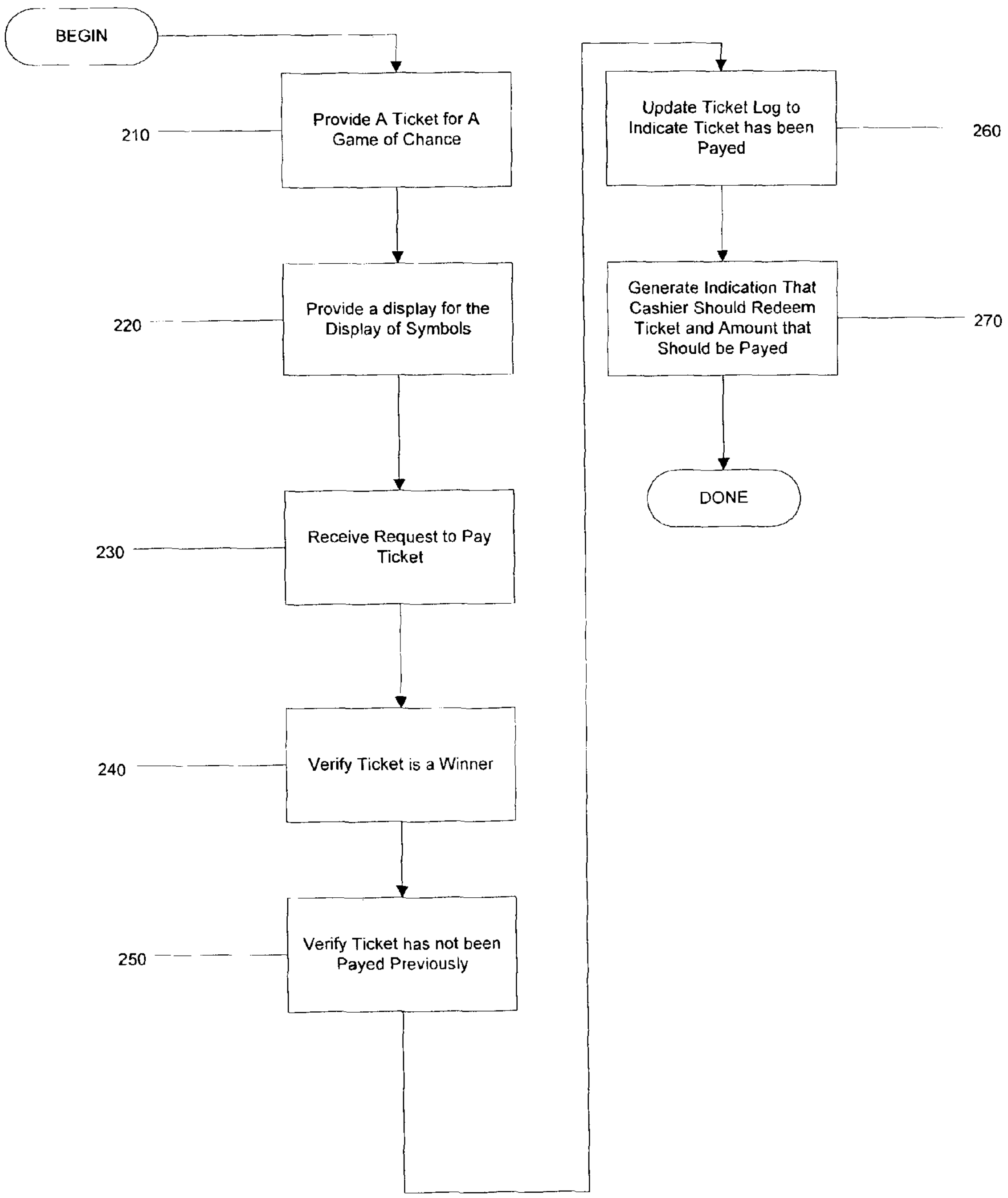
FIG. 2 illustrates an example procedure for facilitating the play of a game of chance, according to an example embodiment of the present invention.

FIG. 2 illustrates an example procedure for facilitating the play of a game of chance, according to an example embodiment of the present invention. In 210, a ticket is provided to a customer. The ticket may be provided by a cashier or attendant, or with an automated point of sale system. It will be appreciated that a customer may be anyone who receives a ticket.

Figure 5:
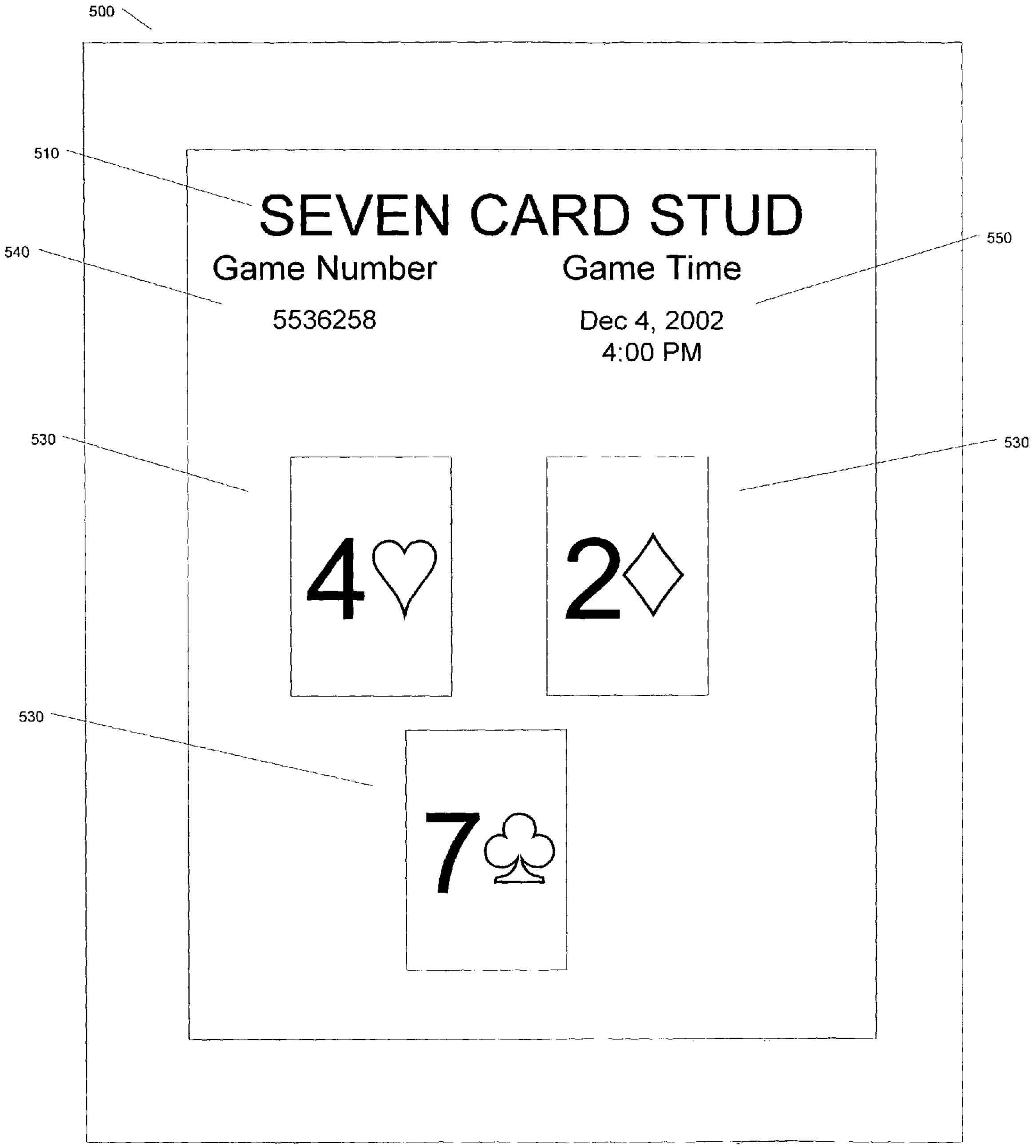
FIG. 5 illustrates an example display screen for use in the play of a game of chance, according to an example embodiment of the present invention.

In 220, a display terminal is provided. The display terminal may display a set of symbols such that a customer may determine whether a ticket is a winning ticket. The set of symbols for display may be chosen from a predetermined set. For example, the symbols may be playing cards chosen from a conventional pack. It will be appreciated that the symbols may also represent symbols in addition to ordinary playing cards, e.g. special playing cards such as jokers or wild cards. An example display is shown in FIG. 5.

In 230, a request to redeem a ticket may be received. The ticket may be tendered, e.g., by turning it in to a cashier or attendant, or with an automated point of sale system by inserting it into an automatic reader.

In 240, whether a ticket is a winning ticket may be verified. This information may be determined by looking up the authentication code or other information uniquely identifying the ticket in a log that includes information identifying the previously sold tickets as winning tickets or losing tickets. In the event that a ticket is identified as a winning ticket the prize may also be located in the log. Alternatively, the prize information may be encoded in the authentication number, e.g., by using a public key encryption system, as is done in some conventional instant win ticket game systems. It will be appreciated that whether a ticket is a winning or losing ticket may not be known until after the display of the symbols. In this event the log may be configured to determine the winning tickets after the set of symbols for display are displayed.

In 250, whether the tendered ticket has been previously tendered may be determined. This may be determined, for example, by examining a redeemed field in a ticket log to verify that the tendered ticket has not been previously redeemed. In the event that the ticket log indicates that a ticket has been previously redeemed a message may be sent to the operator indicating that the ticket has been redeemed.

In 260, a ticket log may be updated to reflect the fact that the tendered ticket has been tendered for redemption. Updating the ticket log to reflect that a ticket has been tendered for redemption may prevent the same ticket from being redeemed a second time at a later date.

In 270, an indication may be provided that the cashier should redeem the tendered ticket, e.g., by displaying a prompt on a redemption system display. The amount to be paid may be displayed to the cashier, and/or directly to the person redeeming the ticket. This indication may indicate both that the ticket should be redeemed and the amount for redemption. Alternatively, in an automated system, the ticket authentication procedure may initiate a ticket payment procedure automatically, once the ticket has been validated. The information regarding the ticket information may be read from a ticket log.

It will be appreciated that other actions may be included in the example procedure for authentication and payment. For example, electronic payment may require different procedures. Extra security measures may be provided for large prizes, or old tickets, or tickets that were sold at different establishments than the one redeeming the ticket.

Example Ticket

Figure 3:
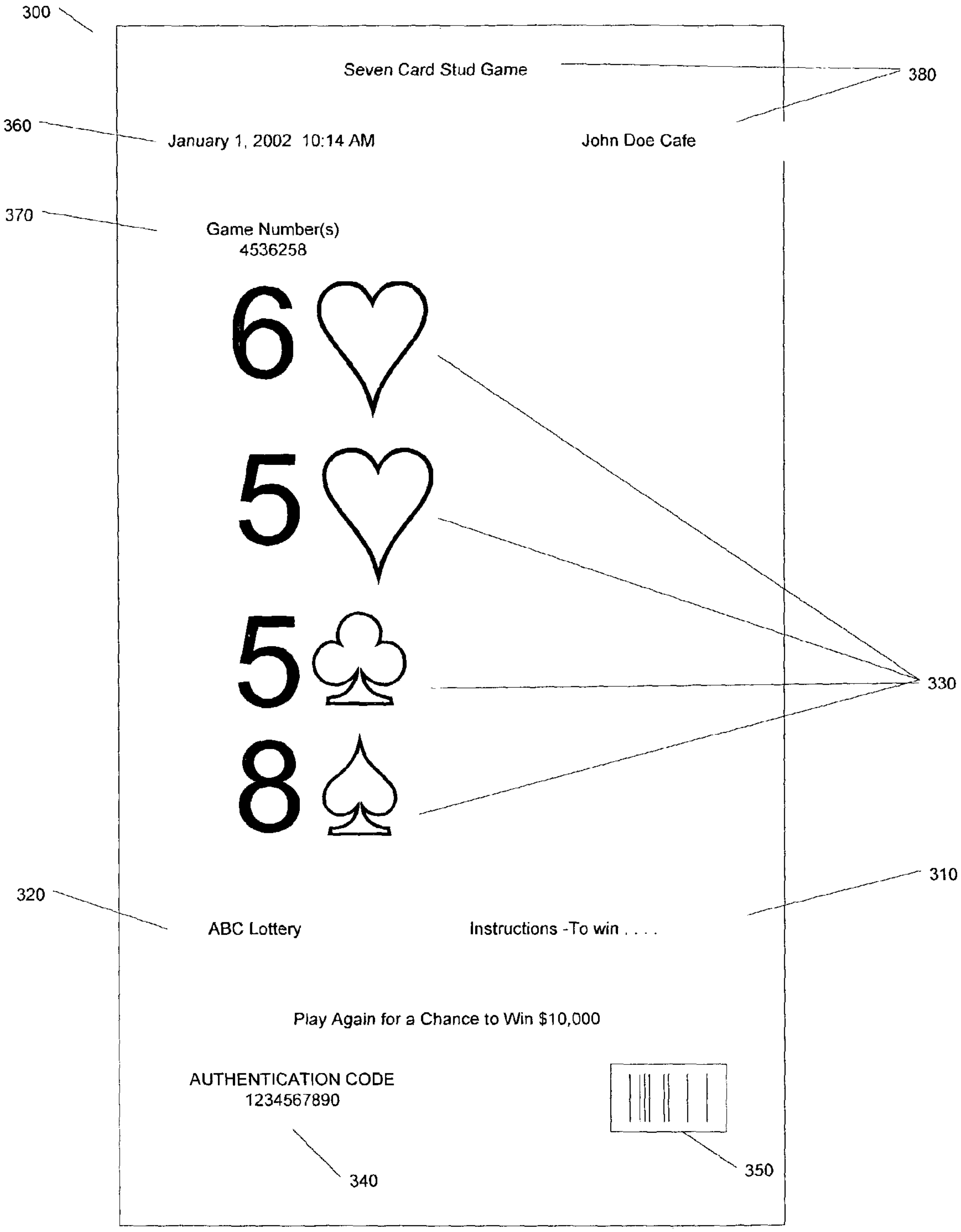
FIG. 3 illustrates an example ticket for use in the play of a game of chance, according to an example embodiment of the present invention.

FIG. 3 illustrates an example ticket, according to an example embodiment of the present invention. The example ticket 300 may be for an online lottery poker type game, such as seven card stud or another lottery type game involving playing cards. The example ticket 300 illustrated in FIG. 3 may be located on a substrate, e.g., a printable substrate such as paper, card stock, plastic, or various laminates. Information may be found on both sides of the example ticket 300.

The example ticket 300 may include a set of symbols 330. The symbols may be chosen from a predetermined set. For example the symbols may be playing cards chosen from a conventional pack. It will be appreciated that the symbols may also represent symbols in addition to ordinary playing cards, e.g., special playing cards such as jokers or wild cards. The number of symbols 330 included on a ticket may vary in light of the rules of the game or the purchase price. The symbols 330 depicted on the example ticket are the 6♥ (six of hearts), 5♥ (five of hearts), 5♣ (five of clubs) and 8♠ (eight of spades). The customer thus has two of a kind (two fives) prior to the display of the second set of playing cards. Additionally, the customer has the 6♥ and the 5♥ and the potential for a straight or a straight flush. A customer having example ticket 100 may thus win in various ways depending on a second set of symbols displayed. If the second set of symbols that are displayed are the 4♥ (four of hearts), 2♥ (two of diamonds), and 7♣ (seven of clubs). The seven cards that represent the customers hand would be 2♦ (two of diamonds), 4♥ (four of hearts), 5♥ (five of hearts), 5♣ (five of clubs), 6♥ (six of hearts), 7♣ (seven of clubs), and 8♠ (eight of spades). According to the ordinary rules of seven card stud, the customer's best hand would be a straight. A straight may be one of the predetermined patterns that a hand may match in order for example ticket 300 to be a winning ticket.

The example ticket 300 may also include an authentication code 340. The authentication code 340 may uniquely identify the ticket. More digits may be provided for greater security. The authentication code 340 may include the information needed to authenticate the ticket when the ticket is redeemed. A machine-readable version of the authentication code 350 may also be located on the example ticket 300. The machine-readable version of the authentication code 350 may be a bar code, e.g., a stacked linear bar code or two-dimensional bar code. A standard 2 of 5 or other standard bar code may be employed. It will be appreciated that other forms of machine-readable information may be included on the ticket, in place of the bar codes, e.g., magnetic strips or smart card capability. It will also be appreciated that the machine readable code 350 may also include other information, e.g., a checking code that may provide sufficient information to identify whether the ticket is a winning ticket without providing sufficient information to authenticate the ticket. Such a check code may be used at a checking station that may be provided to allow customers to test whether they have winning tickets.

The example ticket may include a time/date field 360. The time/date field may include the time/date the ticket was purchased. In the alternative the time/date field may include the time/date of the display of the second set of symbols.

The example ticket may include a games played field 370. It will be appreciated that each time symbols are displayed on the display terminal it may be a separate game. The games played field 370 field may indicate the game or games that the ticket is purchased for. Typically, the game field may be for the next game available—the next set of symbols to be displayed. However, it will be appreciated that the customer may be able to select the game to be played and the customer may be able to use the same ticket for more than one game.

The example ticket 300 may include information not directly involved in the play of the game provided on the ticket. Located on the example ticket 300 may be instructions 310 for playing the game or for the use and/or redemption of the ticket. Additionally, the instructions 310 may include a chart indicating the prize received should a predetermined patterns be matched. The example chart may indicate the predetermined patterns that may result in a winning tickets and the prize amount for each predetermined pattern. It will be appreciated that the prize amount for each predetermined pattern and the predetermined patterns that result in a winning tickets may vary.

It will be appreciated that other information 380 may be included in the example ticket, e.g., the identity of the agent selling the ticket, an identification number for the point of sale terminal that the ticket was sold from, additional advertising information, coupons, etc. Rules of the game and/or legal disclaimers may be printed on the ticket, e.g., on the reverse side. Additional security and authentication information may also be added, e.g., multiple layer, special marks, etc.

A Second Example Ticket

Figure 4:
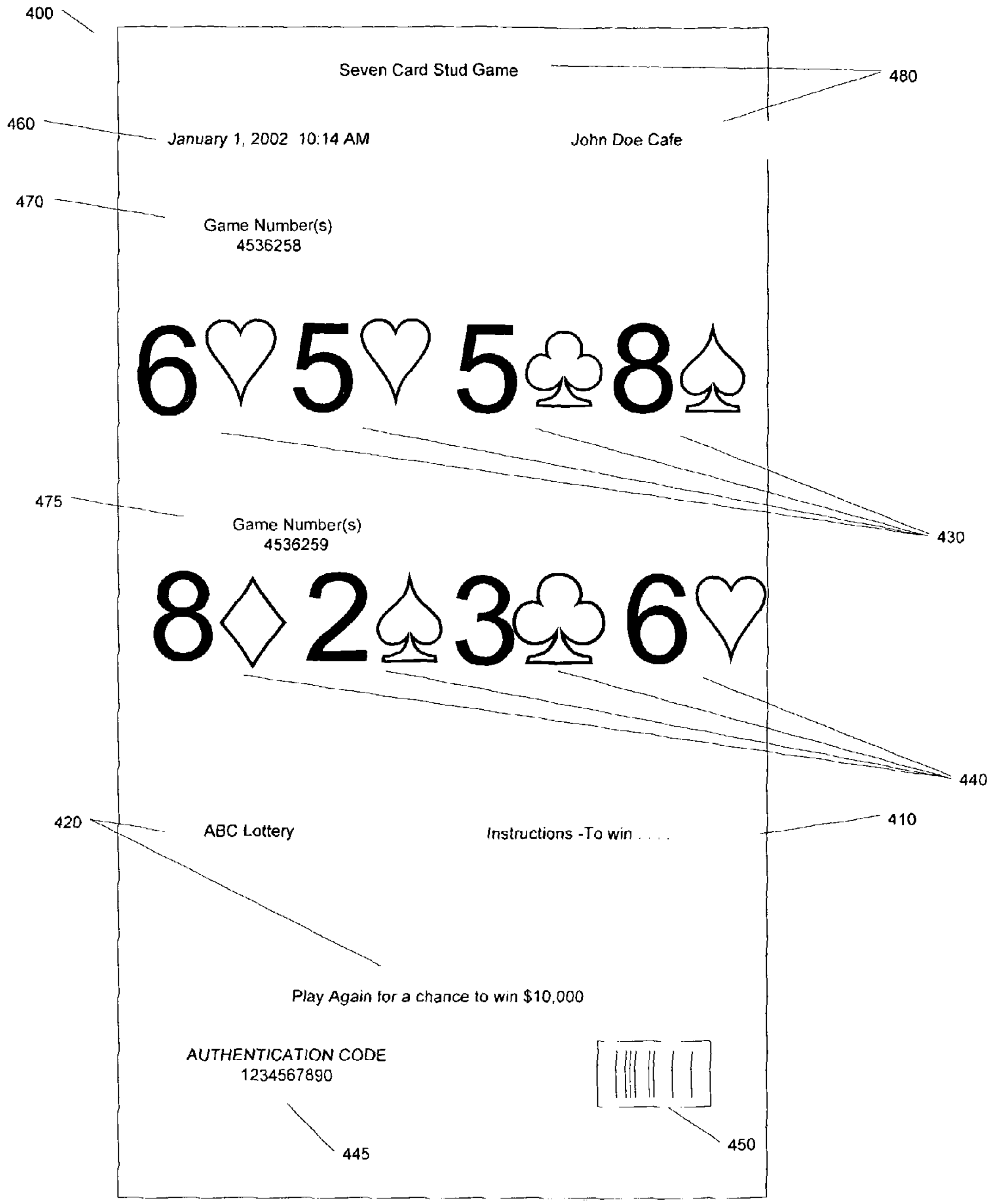
FIG. 4 illustrates a second example ticket for use in the play of a game of chance, according to a second example embodiment of the present invention.

FIG. 4 illustrates a second example ticket, according to an example embodiment of the present invention. The second ticket 400 may also be for a lottery poker type game, such as seven card stud or another lottery type game involving playing cards. The second ticket 400 may be located on a substrate, e.g., a printable substrate such as paper, card stock, plastic, or various laminates. Information may be found on both sides of the ticket 400. The second ticket 400 is for multiple chances in a single or multiple games.

The second ticket 400 may include two sets of symbols 430 and 440, such as playing cards. It will be appreciated that the symbols may represent in addition to ordinary playing cards; special playing cards such as wild cards. The first set of symbols 430 depicted on the second ticket are the 6♥ (six of hearts), 5♥ (five of hearts), 5♣ (five of clubs) and 8♠ (eight of spades). The second set of symbols 440 depicted on the second ticket are the 8♦ (eight of diamonds), 2♠ (two of spades), 3♣ (three of clubs) and 6♦ (six of hearts). The two sets of symbols 430 and 440 may each represent a separate chance of winning a prize. It will be appreciated that the two sets of symbols may be for the same game or for different games. Each set of symbols 430 and 440 may be combined with a set of symbols to be displayed to create a separate hand of cards.

Using the first set of symbols 430, the customer initial first hand consists of two of a kind (two fives) prior to the display of any symbols. Additionally, the customer has the 6♥ and the 5♥ and the potential for a straight or a straight flush. In this manner the customer may win in various ways depending on the symbols to be displayed. If the symbols that are displayed are the 4♥ (four of hearts), 2♦ (two of diamonds), and 7♣ (seven of clubs) then the seven cards that represent the customers first hand would then be 2♦ (two of spades), 4♥ (four of hearts), 5♥ (five of hearts), 5♣ (five of clubs), 6♥ (six of hearts), 7♣ (seven of clubs), 8♠ (eight of spades). According to the ordinary rules of seven card stud, the customer's best five card hand would be a straight. A straight may be one of the predetermined patterns that a hand may match in order for the ticket 400 to be a winning ticket.

Using the second set of symbols 440 depicted on the second ticket 400, the customer's initial second hand consists of the 8♦ (eight of diamonds), 2♠ (two of spades), 3♣ (three of clubs) and 6♥ (six of hearts) prior to the display of a second set of symbols. If the second set of symbols 440 depicted on the second ticket 400 were for the same game as the first set of symbols 430, as described in the above example, then the 4♥ (four of hearts), 2♦ (two of diamonds), and 7♣ (seven of clubs) would again be the displayed on the display terminal. In this example, the seven cards that would represent the customers second hand would then be 8♦ (eight of diamonds), 2♠ (two of spades), 3♣ (three of clubs), 6♥ (six of hearts), 2♦ (two of diamonds), 4♥ (four of hearts), 7♣ (seven of clubs) and 8♠ (eight of spades). According to the ordinary rules of seven card stud, the customer's best hand would a pair of twos. A pair may be one of the predetermined patterns that a hand may match in order for the second ticket 400 to be a winning ticket. If either hand of playing cards (the one created using the first set of symbols 430 depicted on second ticket 400 or the one created using the second set of symbols 440 depicted on second ticket 400) matches a predetermined pattern then the ticket is a winning ticket.

The second ticket 400 thus allows the customer to create two hands of cards each with a chance at winning a prize. If either the first hand of cards or the second hand of cards matches one of the predetermined patterns then the ticket may be a winning ticket and the ticket holder may receive a prize. The prize may vary depending on whether one of or both of the hands of cards matches a predetermined pattern. It will be appreciated that more than two sets of symbols may be represented on a ticket.

The second ticket 400 may include two games played field 470 and 475. It will be appreciated that each time symbols are displayed on the display terminal it may be a separate game. Each games played field 470 and 475 may indicate the game or games that the each set of symbols on the second ticket may be played for. Typically, the game field may be for the next game available—the next set of cards to be displayed. However, it will be appreciated that the customer may be able to select the game to be played and the customer may be able to use the same ticket for more than one game. In the second ticket 400 depicted in FIG. 4 the first games played field 470 indicates that the first set of symbols 430 are to be combined with the symbols displayed in game number 4536258. The second games played field 475 indicates that the second set of symbols 440 are to be combined with the symbols displayed in game number 4536259. Thus, the first set of symbols 430 depicted on the second ticket 400 and the second set of symbols 440 depicted on the second ticket 400 would not be for the same game.

The second ticket may also include an authentication code 445. The authentication code 445 may uniquely identify the ticket. More digits may be provided for greater security. The authentication code may include the information needed to authenticate the ticket when the ticket is redeemed. A machine-readable version of the authentication code 450 may also be located on the second ticket 400. The machine-readable version of the authentication code 450 may be a bar code, e.g., a stacked linear bar code or two-dimensional bar code. A standard 2 of 5 or other standard bar code may be employed. It will be appreciated that other forms of machine-readable information may be included on the ticket, in place of the bar codes, e.g., magnetic strips or smart card capability. It will also be appreciated that the machine readable code 450 may also include other information, e.g., a checking code that may provide sufficient information to identify whether the ticket is a winning ticket without providing sufficient information to authenticate the ticket. Such a check code may be used at a checking station that may be provided to allow customers to test whether they have winning tickets.

The second ticket may include a time/date field 460. The time/date field may be the same as the time date field on the first example ticket 300.

The second ticket 400 may include information not directly involved in the play of the game provided on the ticket. Located on the example ticket 400 may be instructions 410 for playing the game or for the use and/or redemption of the ticket. Additionally, the instructions 410 may include a chart indicating the prize received should a predetermined pattern be matched. The example chart may indicate the predetermined patterns that may result in a winning ticket and the prize amount for each predetermined pattern. It will be appreciated that the prize amount for each predetermined pattern and the predetermined patterns that result in a winning ticket may vary.

It will be appreciated that other information 480 may be included in the second ticket 400, e.g., the identity of the agent selling the ticket, an identification number for the point of sale terminal that the ticket was sold from, additional advertising information, coupons, etc. Rules of the game and/or legal disclaimers may be printed on the ticket, e.g., on the reverse side. Additional security and authentication information may also be added, e.g., multiple layer, special marks, etc.

Example Display Terminal Screen

FIG. 5 depicts an example display terminal screen according to an example embodiment of the present invention. The display terminal screen 500 may be configured to display information for the play of a game. It will be appreciated that the display terminal hardware may be the same type of display terminal currently used in the Keno lottery games, e.g. television.

The display terminal screen 500 may be configured to display the name of the game 510. Additionally, other information may be displayed such as the rules of the game, advertisements, etc.

The display terminal screen 500 may be configured to display a set of symbols 530. Each symbol 530 may represent a playing card. In FIG. 5, the symbols 530 that are displayed on the display terminal screen 500 are the 4♥ (four of hearts), 2♦ (two of diamonds), and 7♣ (seven of clubs). This set of symbols 530 may be combined with symbols depicted on a customer's ticket, as explained above, to create a customer's hand. It will be appreciated that the number of symbols displayed on the display terminal may vary depending on the rules of the game. It will further be appreciated that the symbols 530 may be displayed one at a time. This may create suspense in that the customer may be able to anticipate the symbols needed to make a ticket a winning ticket. Additionally, it will be appreciated that the symbols 530 may only be displayed on a portion of the screen, for example the bottom or the side.

The display terminal screen 500 may be configured to display a game number 540. The game number may indicate the number of the game the set of symbols 530 are displayed for. Each set of symbols displayed may be for a separate game. Each time a different set of symbols is displayed the game number may be incremented. For example in FIG. 5, the game number is 4536258.

The display terminal screen 500 may be configured to display a game time field 550. The game time field may indicate the date or time of the present game. Additionally, the game time field 550 may indicate the time remaining until the next game is to be played.

It will be appreciated that the display terminal screen 500 may be configured to display additional information. For instance, the previous games set of symbols displayed may remain displayed on a portion of the screen.

Example Prize Pool

In an example embodiment of the present invention, a prize pool may be used to determine the winnings available and collected during game play. In this way the amount and percentage of prizes paid may be determined at the time of the sale of the tickets. The system may thus be able to determine whether a ticket is a winning ticket at the time of the sale of the ticket. Although, whether a ticket is a winning ticket may not be apparent to a customer or even the ticket vendor until after the display of the second set of symbols it may be known to the system.

Figure 6A:
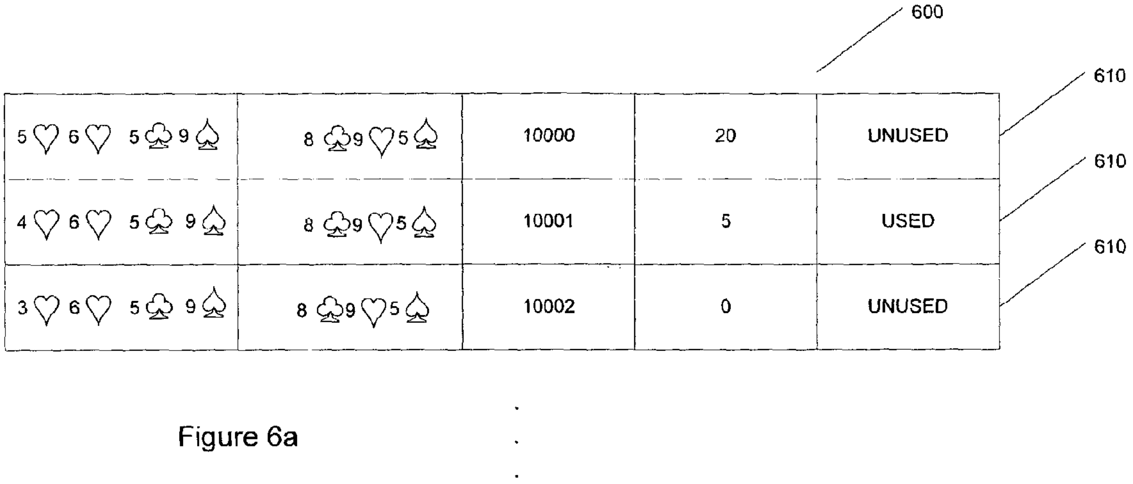
FIG. 6 illustrates an example prize pool for use in facilitating the play of a game of chance, according to an example embodiment of the present invention.

FIG. 6*a* illustrates an example prize pool, according to an example embodiment of the present invention. Although the example prize pool 600 is illustrated as a table or array, it will be appreciated that other conventional data structures may be employed, e.g., a relational database, a linked list, a tree, a programmer defined object, etc. The example prize pool 600 may include a plurality of entries 610. Each entry 610 may correspond to a chance in a game that may be sold to a customer. Each game may have a separate prize pool.

Figure 6B:
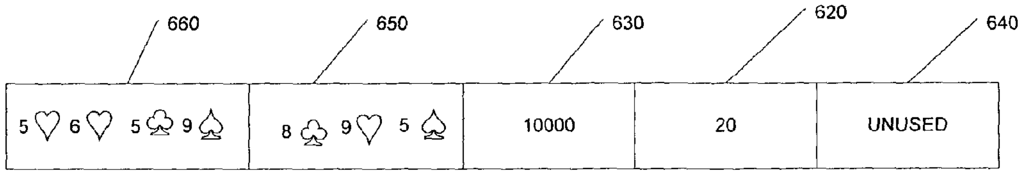

FIG. 6*b* illustrates an example entry 610 from the example prize pool, according to an example embodiment of the present invention. The example entry 610 may include a plurality of fields with information about chances in the example game. Each entry may include a number or index 610 that identifies a chance in the game and the prize entry. Each entry 610 may also include an amount field 620, that indicates the base amount that will be won by each chance. When a winning ticket is redeemed this amount may be awarded based upon this chance. If a ticket is for multiple chances than the cumulative amount won by all chances on the ticket may be awarded.

Each entry 610 may include a game field 660 containing the symbols that are to be placed on the ticket. These symbols may be compared with symbols to be displayed so that the customer will be able to determine the amount 620 that may be won by the chance. Each entry may additionally include a field of displayed symbols 650 which may include the symbols that are to be displayed for the game. Since, the displayed symbols 650 identify a game, an alternative to having the displayed symbols field 650, would be to have a game number field. In FIG. 6*b*, the displayed symbols 650 are the 8♣ (eight of clubs), 9♥ (nine of hearts) and the 5♠ (five of spades). If a ticket is purchased for a single chance in this game a chance number or index 630 may be randomly selected. If the chance number or index number 630 is selected to be 10000 then the symbols to be included on the ticket would be 5♥ (five of hearts), 6♣ (six of hearts), 5♠ (five of clubs), and 9♠ (nine of spades), the symbols contained in the game field 660. In this example a full house would pay out $20 on this chance, as indicated by the amount field 620. It will be appreciated that the displayed symbols and the game field 660 need not be included in the prize pool. If ticket is purchased for multiple chances then the prize pool may be indexed once for each chance to be purchased.

The entry 610 may also include a "used" field 640 that is indicative of whether the particular chance has been sold or not. In the event that an entry is randomly indexed and the used field 640 indicates that the entry has been used, the prize pool may be randomly indexed for another entry. Other information may also be included in the entry 610, for example the amount the ticket was sold for, the number of the game the ticket was sold for etc. It will also be appreciated that different data structures may be used for the entry, for example it could be a linked list entry, or the information could be spread over multiple tables in a relational database with a common index.

It will be appreciated that, by varying the size and composition of the prize pool, the properties of the game may be varied. The average probability that a chance in a game is a winning chance may be increased by increasing the number of winning entries in the prize pool. Variability of the game may be increased by having a few large prizes.

Second Example Prize Pool

In an example embodiment of the present invention, a prize pool may be used to determine the winnings available and collected during game play. In this way the amount and percentage of prizes paid may be determined at the time of the sale of the tickets. The system may thus be able to determine whether a ticket is a winning ticket at the time of the sale of the ticket. Although, whether a ticket is a winning ticket may not be apparent to a customer or even the ticket vendor until after the display of the second set of symbols it may be known to the system.

Figure 7:
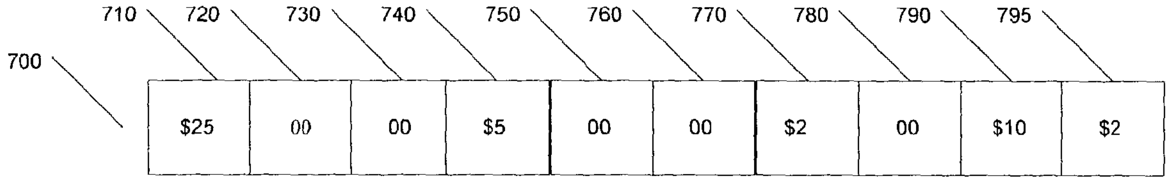
FIG. 7 illustrates a second example prize pool for use in facilitating the play of a game of chance, according to a second example embodiment of the present invention.

FIG. 7 illustrates a second example prize pool, according to an example embodiment of the present invention. Although the second example prize pool 700 is illustrated as a table or array of values, it will be appreciated that other conventional data structures may be employed, e.g., a relational database, a linked list, a tree, a programmer defined object, etc. The example prize pool 700 may include a plurality of entries 710, 720, 730, 740, 750, 760, 770, 780, 790 and 795. Each entry may correspond to a chance in a game that may be sold to a customer. Each game may have a separate prize pool.

The second example prize pool 700 has ten entries. In this example, a random number between one and ten may be generated to index into the table of values. If the random number generated is four then the fourth entry may be indexed. In this example, the fourth entry 740 indicates that the chance would result in a $5. A set of symbols may then be generated on a ticket that may indicate to the customer that this chance in the game is a winning chance with a prize of $5. It will be appreciated that after an entry is indexed that entry may be deleted from the prize pool. In the example where the fourth entry is indexed, this entry may be deleted leaving only nine entries to index for subsequent use.

Example Ticket Log

FIG. 8*a* illustrates an example ticket log, according to an example embodiment of the present invention. The example ticket log 800 may be used to keep track of tickets that have been sold, as well as whether the sold tickets have been redeemed. The example ticket log may include a plurality of entries 810, each entry corresponding to a ticket that has been sold. It will be appreciated that the ticket log, although illustrated as a table, may be stored in a variety of conventional data structures, e.g., as a linked list, or a custom-designed object. It will also be appreciated that the ticket log information may be incorporated in other data structures, rather than as a separate log, e.g., if the prize pool were stored in a relational database, the information may be stored in the prize pool may be split in multiple tables in a way that allows the information to be accessed as a log using conventional database queries.

FIG. 8*b* illustrates an example entry 810 from the example ticket log, according to an example embodiment of the present invention. The example entry 810 may include a plurality of fields that provide information about a particular ticket that has been sold. The example entry 810 may include a ticket number 860 that uniquely identifies a ticket that has been sold. This ticket number 860 may be an authentication code.

The example entry 810 may include a game field 850 that indicates the game or games that the ticket is for.

The example entry 810 may include a time field 840 that may indicate the time the corresponding ticket was sold.

The example entry 810 may include a prize field 830, which may indicate the amount that will be paid upon the tickets redemption. In the event that a ticket is for multiple chances in a single game or multiple games then the prize field 830 may represent the total amount won by a ticket (the total amount won by each chance in each game).

The example entry may include a status field 820 that may indicate whether the ticket has been redeemed, and if it has when the redemption occurred. It will be appreciated that the ticket log entry may include other fields not shown, e.g., an indication where or by whom the ticket was sold or redeemed, the value of the authentication code for the ticket, price information for the ticket, an indication of the symbols to be displayed for that game.

Example Procedure for Generating a Ticket

Figure 9:
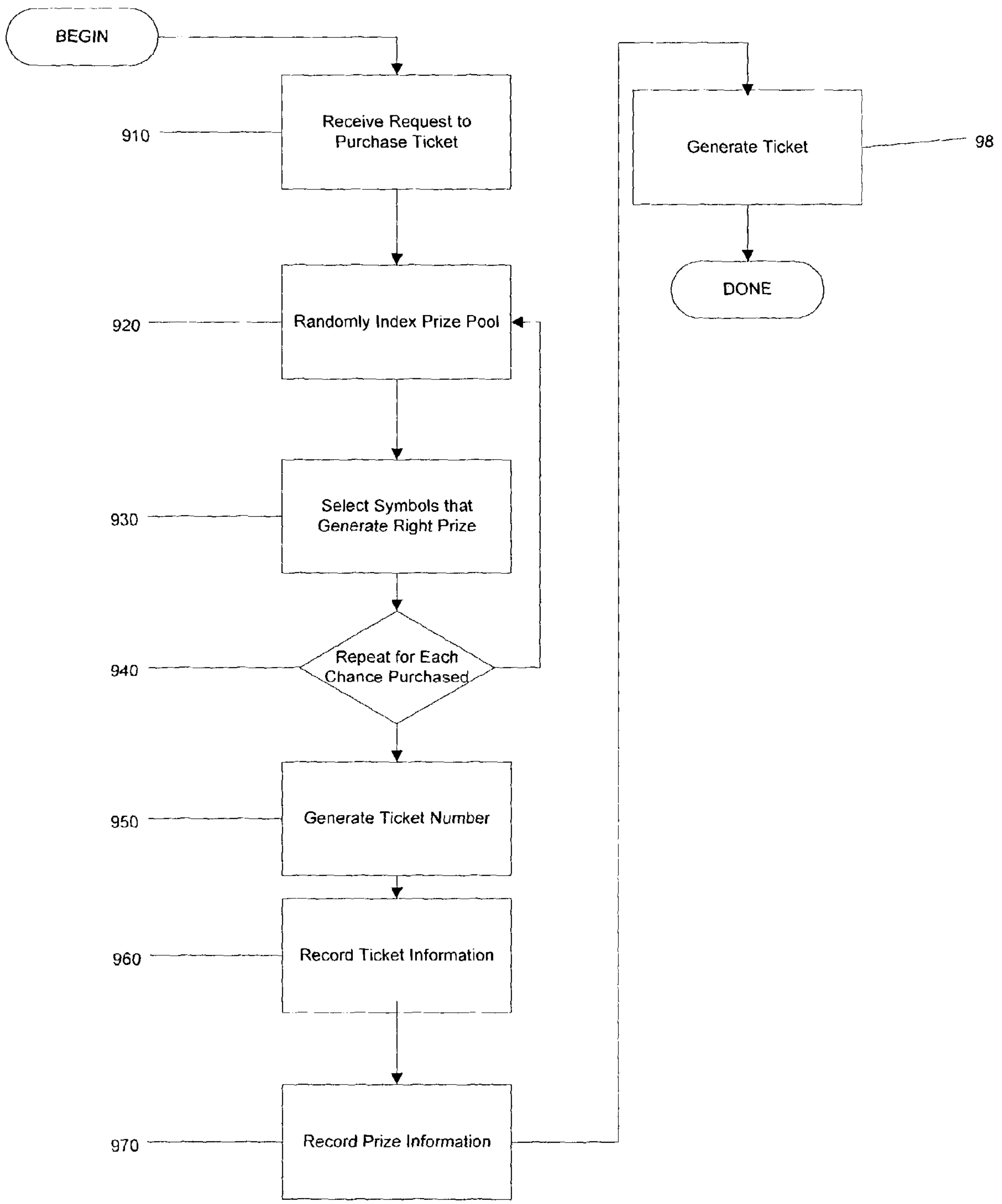
FIG. 9 illustrates an example procedure for use in facilitating the play of a game of chance, according to an example embodiment of the present invention.

FIG. 9 illustrates an example procedure for facilitating the play of a game of chance, according to an example embodiment of the present invention. In this example embodiment the set of symbols to be displayed on the display terminal would be known by the system prior to the request to generate the ticket. In 910, a request is made for a ticket. The request for a ticket may be made to a cashier or establishment operator or by purchasing a ticket from a vending machine that generates such tickets.

In 920, for each chance that is requested a prize pool is randomly indexed. The prize pool once indexed generates an entry. If an entry is used then the prize pool is indexed until an unused entry is located. An entry includes information regarding whether the chance is a winning chance, and thus whether a ticket is a winning ticket. Additionally, the prize for each chance may be included in each entry. If when indexed a prize is determined to be 0 then the chance may not be a winning chance.

In 930, the symbols to be placed on the ticket that will generate the prize are determined. The symbols that generate the proper prize may be included in the prize pool entry or a program may be used to generate the symbols to create the proper prize. For example, if the prize is determined to be $5 then the symbols to be placed on a ticket when combined with the symbols to be displayed must generate a hand of cards that pays a prize of $5. In this example, if the predetermined pattern that awards a prize of $5 is three of a kind then the hand of cards must equal three of a kind.

In 940, if the customer wishes to purchase more than a single chance then the process of indexing the prize pool and determining the symbols to be placed on the ticket are repeated for each chance requested.

In 950, a ticket number is generated. The ticket number uniquely identifies the ticket. The ticket number may be the authentication number.

In 960, the ticket information is recorded. This information may include the symbols placed on the ticket, the game each chance is for, the total value of the winning ticket and the location the ticket was purchased at.

In 970, the prize information is recorded. This may include marking the prize pool as used for each entry that was indexed in the prize pool.

In 980, the ticket is generated. A ticket may be generated by printing the ticket. For example the ticket may include a set of symbols, an authentication code, a time/date field, a games played field, or game instructions.

Example Chart of Winning Predetermined Patterns

FIG. 10 illustrates an example chart for determining the value of a winning hand. This example chart may be printed on a ticket or made available to customers who purchase tickets.

A winning hand 1005, 1010, 1015, 1020, 1025, 1030 and 1035 is a hand that results in a winning ticket. Prize amounts 1040, 1045, 1050, 1055, 1060, 1065 and 1070 represent the values of the winning hands. For instance if a combination of a first and second set of symbols, as explained above, results in two pair, winning hand 1010, the value of that hand 1045, or the amount that that hand may be redeemed for is $2. The chart enables a customer to determine the value of each hand represented on a ticket. It will be appreciated that the values for each hand and the hands that result in a winning tickets may vary.

Example Lottery Terminal System

Figure 11:
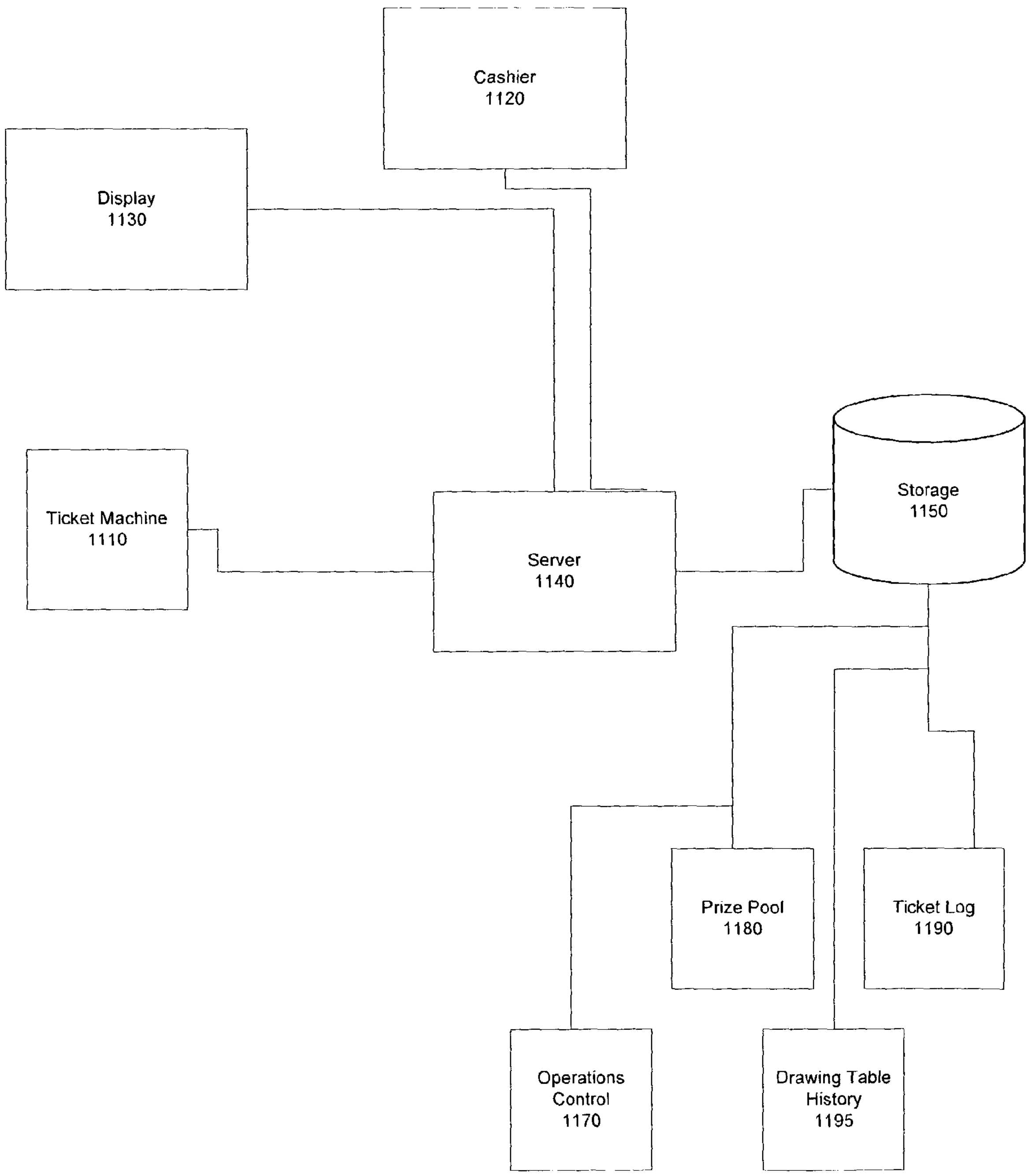
FIG. 11 illustrates an example lottery system for use in facilitating the play of a game of chance, according to an example embodiment of the present invention.

FIG. 11 illustrates an example lottery terminal system according to an example embodiment of the present invention. FIG. 11 illustrates a logical view of an example lottery terminal system, according to an example embodiment of the present invention. The example lottery terminal system may include one or more ticket machines 1110, one or more cashier machines 1120, and one or more or display devices or monitors 1130.

The example lottery terminal system may include a server 1140. The server may include a conventional microprocessor or custom designed control circuitry. The server may be in communication with the ticket machine 1110, cashier machine 1120, and display device 1130. The server 1140 may be used to control the operation of the other components of the lottery terminal system, e.g., by executing a control program that facilitates the play of a game of chance. The server may be configured to control the lottery terminal system in carrying out procedures for facilitating the play of a lottery game, generating lottery tickets, generating a set of symbols for display, and authenticating and paying winning lottery tickets, as were described above.

The example lottery terminal system may include a storage subsystem 1150. The storage subsystem may include RAM, ROM, disk, optical disk, flash memory, or other conventional storage media. The storage subsystem may be a separate component from the server 1140, or may be included as part of the server 1140.

Stored in the storage subsystem 1150 may be programs and data used to control or facilitate the play of lottery games. A game control program 1170 may be used to control the sale and redemption of gaming chances in the procedures for playing and facilitating the play of a lottery game that were described previously. A prize pool 1180 may contain information related to a pool of chances that may be sold in the lottery game. Each entry in the prize pool may correspond to a single chance that may be sold in the lottery game. Each entry in the prize pool may also contain an indication of whether the particular chance is a winner, a prize amount, as well as information about when and whether a particular chance has been sold. The storage subsystem may also include a ticket log 1190, that may be used to record the sale of tickets and facilitate procedures for redeeming tickets. The storage subsystem may further include a drawing table history 1195, that may be used to record drawing information for all drawings that have occurred, e.g., record set of display symbols for each game.

It will be appreciated that the programs, prize pool, and ticket log need not be located in a particular storage subsystem, e.g., they could reside directly on the server. It will also be appreciated that other elements may be included in the example lottery terminal system, e.g. a operations control program, security, auditing capabilities, etc.

Modifications

In the preceding specification, the present invention has been described with reference to specific example embodiments thereof. It will, however, be evident that various modifications and changes may be made thereunto without departing from the broader spirit and scope of the present invention as set forth in the claims that follow. The specification and drawings are accordingly to be regarded in an illustrative rather than restrictive sense.

The invention claimed is:

1. A method for facilitating the play of a game of chance, comprising;

responsive to a request by a player to enter the game, selecting an outcome for the game chosen from a plurality of possible outcomes by a processor;

after the outcome is selected, determining a first set of symbols and a second set of symbols by said processor, each set of symbols representing a set of playing cards, wherein the first and second sets of symbols form a poker hand, and wherein the value of the poker hand represents a prize associated with the outcome;

after determining the first set of symbols and the second set of symbols, printing the first set of symbols on a ticket, and providing the ticket to the player;

after providing the ticket, displaying the second set of symbols on a display terminal; and responsive to the ticket being tendered for redemption, paying the prize associated with the game outcome, the prize being indicated by the value of the poker hand formed from the combination of the first and second sets of symbols.

2. The method of claim 1, further comprising:

prior to providing the ticket to the player, determining whether the ticket is a winner.

3. The method of claim 1, wherein the second set of symbols is determined prior to the first set of symbols, the method further comprising:

determining the first set of symbols based on the prize associated with the ticket and the second set of symbols.

4. The method of playing a game of chance of claim 3, wherein the prize associated with the ticket is selected by randomly sampling from a prize pool without replacement.

5. The method of claim 3, wherein the prize associated with the ticket is selected by randomly sampling from a prize pool with replacement after each sample.

6. The method claim 1, further comprising:

when the ticket is provided, providing an indication of a future time when the second set of symbols will be displayed, the displaying the second set of symbols occurring at the indicated future time.

7. The method of claim 6, wherein the indication of the future time is provided on the ticket.

8. The method of claim 1, wherein the ticket includes a third set of symbols for an additional game, the third set of symbols representing a set of playing cards, the method further comprising:

after providing the ticket, displaying a fourth set of symbols on the display terminal, the fourth set of symbols representing a set of playing cards; and responsive to the ticket being tendered for redemption paying an additional prize associated with the ticket, the additional prize based on the value of an additional poker hand formed from the combination of the third and fourth sets of symbols.

9. The method claim 8, further comprising:

when the ticket is provided, providing an indication of a first future time when the second set of symbols will be displayed and a second future time when the fourth set of symbols will be displayed, the displaying the second set of symbols occurring at the indicated first future time and the displaying of the fourth set of symbols occurring at the indicated second future time.

10. The method of claim 9, wherein the indication of the first and second future times is provided on the ticket.

11. The method of claim 8, further comprising:

prior to providing the ticket to the player, determining the fourth set of symbols;

prior to providing the ticket to the player, selecting the additional prize; and prior to providing the ticket to the player, determining the third set of symbols based on the additional prize and the fourth set of symbols.

12. The method of claim 1, wherein the ticket contains an authentication code, the method further comprising:

validating the ticket using the authentication code prior to redeeming the ticket for the prize.

13. A non-transitory article of manufacture comprising a computer-readable medium having stored thereon instructions adapted to be executed by a processor, the instructions which, when executed, define a series of steps to be used to control a procedure, the procedure comprising:

responsive to a request by a player to enter a game, selecting an outcome for the game chosen from a plurality of possible outcomes;

after the outcome is selected, determining a first set of symbols and a second set of symbols, each set of symbols representing a set of playing cards, wherein the first and second sets of symbols form a poker hand, and wherein the value of the poker hand represents a prize associated with the outcome;

after determining the first set of symbols and the second set of symbols, printing the first set of symbols on a ticket, and providing the ticket to the player;

after providing the ticket, displaying the second set of symbols on a display terminal; and responsive to the ticket being tendered for redemption, paying the prize associated with the game outcome, the prize being indicated by the value of the poker hand formed from the combination of the first and second sets of symbols.

14. The article of manufacture of claim 13, wherein the ticket includes a third set of symbols for an additional game, the third set of symbols representing a set of playing cards, wherein the procedure further comprises:

after providing the ticket, displaying a fourth set of symbols on the display terminal, the fourth set of symbols representing a set of playing cards; and responsive to the ticket being tendered for redemption, paying an additional prize associated with the ticket, the additional prize based on the value of an additional poker hand formed from the combination of the third and fourth sets of symbols.

15. The article of manufacture of claim 14, wherein the procedure further comprises:

prior to providing the ticket to the player, determining the fourth set of symbols;

prior to providing the ticket to the player, selecting the additional prize; and prior to providing the ticket to the player, determining the third set of symbols based on the additional prize and the fourth set of symbols.

16. A method of playing a game of chance, comprising:

receiving a ticket including a first set of symbols, said first set of symbols representing a set of playing cards, the first set of symbols having been determined based on a game outcome selected by a first processor prior to receiving the ticket;

after receiving the ticket, viewing on a display terminal a second set of symbols which were determined by the first processor prior to the receiving of the ticket based on the game outcome selected by the first processor prior to receiving the ticket, the second set of symbols representing a set of playing cards;

determining if the ticket is a winning ticket by the first processor or by a second processor, based on the value of a poker hand formed from the combination of the first and second sets of symbols; and receiving a prize based on the value of the poker hand.

17. The method of claim 16, further comprising:

tendering the winning ticket for the prize.

18. The method of playing a game of chance of claim 16, wherein the ticket contains an authentication code, and the prize is received responsive to the authentication code being validated.

19. The method claim 16, further comprising:

when the ticket is received, receiving an indication of a future time when the second set of symbols will be displayed, the viewing the second set of symbols occurring at the indicated future time.

20. The method of claim 19, wherein the indication of the future time is provided on the ticket.

21. The method of claim 16, wherein the ticket includes a third set of symbols each representing a playing card, the method further comprising:

viewing a fourth set of symbols on the display terminal, the fourth set of symbols representing a set of playing cards;

determining if the ticket is a wining ticket based on the valued of a second poker hand formed from the combination of the third and fourth sets of symbols; and receiving a prize based on the second poker hand.

22. The method claim 21, further comprising:

when the ticket is received, receiving an indication of a first future time when the second set of symbols will be displayed and a second future time when the fourth set of symbols will be displayed, the viewing the second set of symbols occurring at the indicated first future time and the viewing the fourth set of symbols occurring at the indicated second future time.

23. The method of claim 22, wherein the indication of the first and second future times is provided on the ticket.

24. The method of claim 16, further comprising:

receiving a payout table, the payout table mapping the value of poker hand ranks to prizes, wherein the value of prize received is associated with the rank of the poker hand in the payout table.

25. A system for a game, comprising:

a processor configured to select a plurality of first sets of symbols and a plurality of second sets of symbols, each first set of symbols representing a partial poker hand for a respective round of the game, each of the second set of symbols representing a remaining poker hand for the respective round of the game;

a ticket comprising a substrate, the substrate comprising:

the plurality of first sets of symbols, the plurality of first sets of symbols having been determined based on a game outcome selected prior to printing the symbols on the substrate, the plurality of second sets of symbols being absent from the ticket; and an authentication code;

wherein each of the plurality of first and second sets of symbols is configured to indicate a respective game outcome selected by the processor before the generation of the ticket for the respective round of the game, the respective game outcome being indicated by the value of a poker hand formed by combining the respective first set of symbols with the respective second set of symbols determined by the processor for the respective round of the game before the generation of the ticket and after the selection of the outcome for the respective round of the game.

26. The system of claim 25, further comprising:

a respective drawing display time associated with each of the plurality of first sets of symbols.

27. The system of claim 25, further comprising:

a respective drawing number associated with each of the plurality of first sets of symbols.

28. The system of claim 25, further comprising:

a payout table on the substrate, the payout table visually indicating the value of prizes associated with different poker hand ranks.

29. The system of claim 25, further comprising:

an instruction on the substrate indicating to the player that the player should combine one of the partial poker hands with one of the remaining poker hands on a display screen to determine a game outcome.

* * * * *